United States Patent [19]

Ferro

[11] Patent Number: 5,212,480
[45] Date of Patent: May 18, 1993

[54] PROCESS FOR THE VISUAL DISPLAY OF THE ATTITUDE OF AN AIRCRAFT FOR AIDING PILOTING IN SPACE

[75] Inventor: Vincent D. Ferro, Toulouse, France

[73] Assignee: Aerospatiale Société Nationale Industrielle, Paris, France

[21] Appl. No.: 609,371

[22] Filed: Nov. 5, 1990

[30] Foreign Application Priority Data

Nov. 17, 1989 [FR] France ............... 89 15115

[51] Int. Cl.$^5$ .................................. G01C 21/00
[52] U.S. Cl. ................................ 340/974; 33/330; 340/973; 340/975; 364/434
[58] Field of Search ............. 340/967, 971, 973-975, 340/979, 980; 33/328, 330; 364/434; 73/178 R

[56] References Cited

U.S. PATENT DOCUMENTS

| | | | |
|---|---|---|---|
| 2,941,306 | 6/1960 | Uecker | 33/330 |
| 4,305,057 | 12/1981 | Rolston | 340/974 |
| 4,513,509 | 4/1985 | Nordström | 340/974 |
| 4,797,836 | 1/1989 | Witek et al. | 340/725 |
| 4,848,706 | 7/1989 | Garg et al. | |
| 4,914,733 | 4/1990 | Gralnick | 340/961 |
| 4,977,401 | 12/1990 | Sjöberg | 340/975 |

FOREIGN PATENT DOCUMENTS

0247265 12/1987 European Pat. Off. .

OTHER PUBLICATIONS

NEC –Research & Development, No. 83, Oct. 1986, pp. 82–91, (Ninomiya et al.).
Journal of Guidance, Control & Dynamics, vol. 11, No. 2, Mar./Apr. 1988, pp. 110–118 (Lambros et al.).

Primary Examiner—Jin F. Ng
Assistant Examiner—Brent A. Swarthout
Attorney, Agent, or Firm—Michael N. Meller

[57] ABSTRACT

The invention relates to a process for the visual display of the attitude of an aircraft to assist piloting or flying in space. On the basis of the values of cardan or gimbal angles ($\psi$, $\theta$, $\phi$) of the aircraft marked in a reference mark linked with the celestial cavity or firmament and on the basis of a calculation of quaternions, the process consists of displaying on a screen (1) on board the aircraft, in particular the following informations: a cruciform reticule (7,8,9), a piloting or flying circle B, the value of the roll angle ($\phi$) in a scale (10), a net formed by portions of meridians (M) and parallels (P) of the celestial cavity, a symbol (V1) representing the direction pointed by the velocity vector of the aircraft, a short term prediction vector (12) for the aircraft attitude, as well as numerical values (19,21,23) for the roll, pitch and yaw velocities. Application is to the piloting of an aircraft in space.

12 Claims, 4 Drawing Sheets

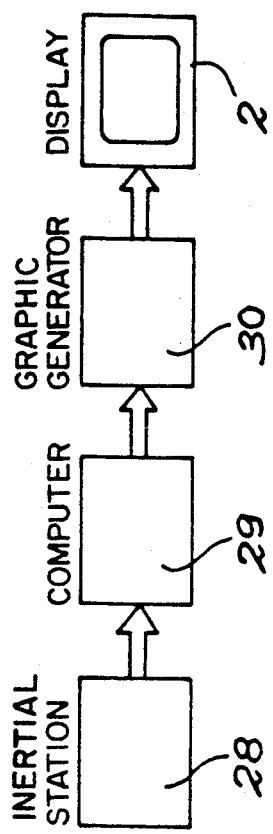
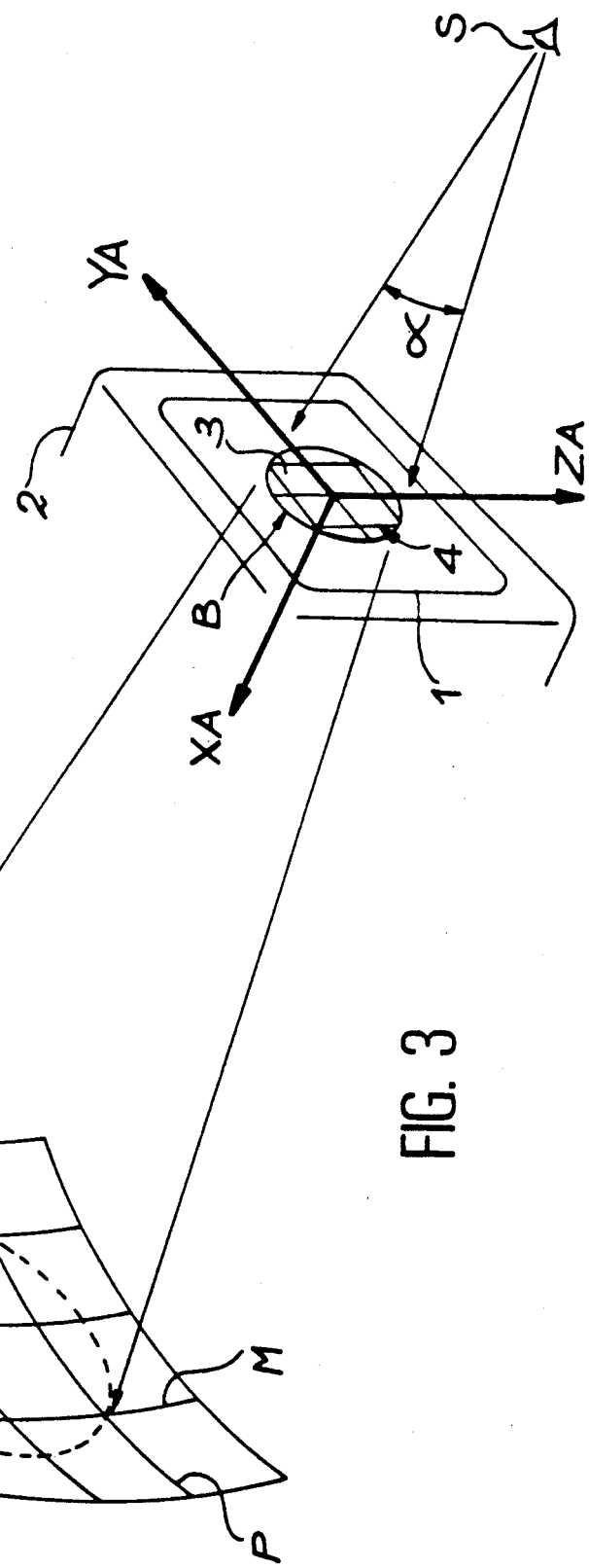

PROCESS FOR THE VISUAL DISPLAY OF THE ATTITUDE OF AN AIRCRAFT FOR AIDING PILOTING IN SPACE

BACKGROUND OF THE INVENTION

The present invention relates to a process for the visual display of the attitude of an aircraft in order to assist flying or piloting in space. It more particularly applies to the ergonomic display and the attitude display of an aircraft in space, as well as the display of values for the angular displacement velocities thereof. It also applies to the simultaneous display of the position of another object such as a space satellite travelling in the surrounding space.

It is not presently known how it is possible to precisely and ergonomically display the attitude of an aircraft and more particularly that of a space vehicle, such as a shuttle. All that is known in connection with aeroplanes consists of processes involving the use of electromechanical devices called "spheres" or display screen devices, enabling the pilot to know the attitude of the aircraft in a restricted space area representing only a few degrees relative to the horizon.

Thus, the attitude of an aircraft is generally indicated by the values of the three cardan or gimbal angles, namely role ($\phi$), pitch ($\theta$) and yaw ($\psi$) defined in a reference mark. This attitude represented in a mark linked with the aircraft loses all accuracy when the pitch angle is close to $\pm 90°$. For example, when a fighter rockets, the information supplied by the "aircraft sphere" are incoherent as a result of sphere oscillations. This information is also incoherent close to the poles (in the vicinity of the poles, $\theta$ is close to $\pm 90°$).

Processes using visual display devices coupled with electronic attitude measuring systems generally have no better performance characteristics than those using the "aircraft sphere". They only give imprecise information on the aircraft attitude, as soon as the pitch angle exceeds 80°, or when the aircraft is travelling close to the poles.

These disadvantages of existing processes used on aircraft become major inconveniences for assisting the flying of a spacecraft.

SUMMARY OF THE INVENTION

The invention specifically aims at obviating these disadvantages by means of a process for displaying on a screen the evolution of an aircraft (particularly a space shuttle) which, whilst supplying ergonomic information concerning the aircraft attitude and other information useful for the flying thereof, also makes it possible to obtain precise attitude information, particularly close to the poles.

These objectives are achieved, particularly by a reference marking of the aircraft attitude in a net of the celestial canopy or firmament partly projected onto a plane perpendicular to the aircraft axis and displayed on a screen of on-board display means.

The invention relates to a process for the display of an aircraft or spacecraft for aiding piloting or flying in space, characterized in that it comprises:

defining a spherical celestial canopy centered on the centre of gravity of the aircraft, having a polar axis oriented towards the celestial north and an equatorial plane perpendicular to said polar axis and passing through a vernal reference marking point;

defining reference marking parallels and meridians on said celestial canopy;

defining a reference mark with orthogonal axes centered on the centre of gravity of the aircraft, a first axis of said mark passing through the vernal point, a second axis coinciding with the polar axis and a third axis being perpendicular to the first and second axes;

defining a specific reference mark of the aircraft with three orthogonal axes, having for its origin the centre of gravity of the aircraft, a first axis directed along a longitudinal axis of the aircraft, a second axis located in a plane of symmetry passing through the longitudinal axis of the aircraft and a third axis perpendicular to the first and second axes of the specific reference mark;

defining the attitude of the aircraft by calculating the cardan angles, i.e. roll, pitch and yaw of the aircraft with respect to the reference mark;

using the values of the cardan angles for displaying, on a screen of display means, the image obtained in a plane perpendicular to the first specific axis of a net formed from portions of meridians and parallels of the celestial canopy projected onto said plane within a piloting or flying circle, displayed on the screen and centered on the first axis of the specific reference mark;

displaying a cruciform reticule with two perpendicular segments intersecting the flying circle, intersecting in the centre of the circle and corresponding respectively to the second and third axes of the specific reference mark, the centre of the circle respectively representing the yaw and pitch angles referenced in longitude and latitude, respectively with respect to a meridian portion and a parallel portion of the net; and displaying the value of the roll angle in a scale of numerical values, close to the intersection of the flying circle with the segment of the reticule corresponding to the second axis of the specific reference mark.

According to another feature of the invention, the process consists in a predetermined circular zone around each pole of the celestial cavity, replacing the display of a net of portions of meridians and parallels of said canopy by a net forming a reference grid within a circle defining said zone.

According to another feature, the process consists of expressing the cardan angles in the form of quaternions in order to display the said net.

According to another feature, the process consists of displaying by a symbol in the net, the location pointed on the celestial cavity by a vector representing the aircraft speed, said symbol being referenced in the canopy in both longitude and latitude for respectively indicating the yaw ($\psi$) and pitch ($\theta$) angles of the aircraft.

According to another feature, the position of another object in space is displayed by a characteristic symbol thereof, referenced in the net by a longitude and a latitude corresponding to said position.

According to another characteristic, the process also consists to a short term prediction vector of the aircraft attitude.

According to another feature, a selected attitude of the aircraft is displayed by an attitude symbol referenced in the net by a longitude and a latitude.

According to another feature, a particular display includes a 0° to 180° meridian portion among the meridian portions displayed in the net.

According to another characteristic, a display includes two reference symbols for roll angles diametrically opposite to the flying circle and on the latter is displayed an intermediate selected roll angle symbol.

According to another feature, a display respectively includes the speed variation values (p,q,r) of the roll, pitch and yaw angles, in cursors mobile with respect to fixed scales of values.

The values (p,q,r) are values of lengths of projections of the instantaneous velocity vector of rotation of the aircraft on the three axes X,Y,Z of the specific reference mark respectively.

According to another feature the respective numerical values of the roll, pitch and yaw angles ($\phi$, $\theta$ and $\psi$) are displayed.

According to another feature, the process consists of displaying respective nominal numerical values for the roll, pitch and yaw angles.

According to another feature, the process consists of allocating specific colour codes to the different information displayed.

According to another feature, the process consists of displaying the attitude in a random reference mark.

The invention is described in greater detail hereinafter relative to non-limitative embodiments and the attached drawings, wherein show:

BRIEF DESCRIPTION OF THE DRAWINGS

FIG. 3 diagrammatically the projection of a portion of the celestial cavity on a plane perpendicular to the axis of the aircraft used in the display process according to the invention.

FIG. 5 diagrammatically a system making it possible to perform the process according to the invention.

DESCRIPTION OF THE PREFERRED EMBODIMENT

Figure 1:
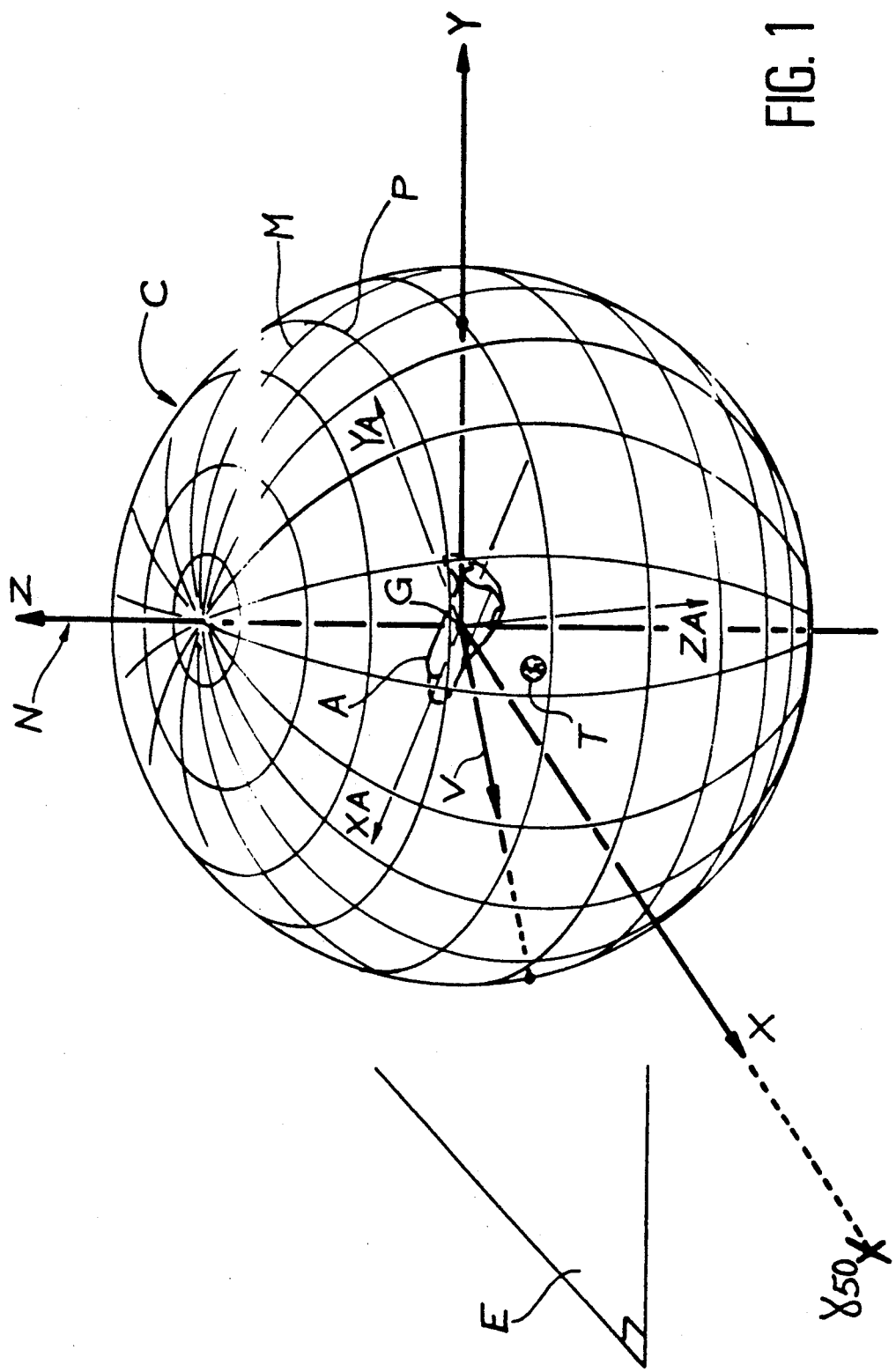
FIG. 1 diagrammatically an aircraft or spacecraft travelling in the celestial canopy or firmament and a cutoff of said canopy, for the reference marking of the position and attitude of said aircraft.

FIG. 1 diagrammatically shows a spherical celestial canopy or firmament C, centered on the centre of gravity of the aircraft or spacecraft A (e.g. a shuttle). The earth is designated T. The canopy (C) has a polar axis oriented towards the celestial north N and an equatorial plane E perpendicular to the polar axis and passing through a vernal point. The latter is in this case the point $\gamma$ 50 which, at the 1950 Spring equinox, represented the intersection point of the ecliptic and terrestrial equator during the passage of the sun from the austral to the boreal hemisphere.

According to the process of the invention, the marking meridians M and parallels P of the attitude of the aircraft A are defined on said celestial canopy. The meridians M are defined by the intersections of the spherical cavity with planes passing through the polar axis thereof. The parallels P are defined by the intersections of the cavity with planes parallel to the equatorial plane E. The meridians M are referenced by a longitude, counted positively towards the east, and the parallels are referenced by a latitude, counted positively towards the celestial north N.

The process then consists of defining a reference mark (G,X,Y,Z) with orthogonal axes and a specific reference (G,$X_A$, $Y_A$, $Z_A$) of the aircraft.

The reference mark has as its origin the centre of gravity G of the aircraft A. A first axis X of said reference mark passes through the vernal point $\gamma$ 50, a second axis Z is directed towards the celestial north N and a third axis Y, which is perpendicular to the first and second axes X, Z being located in the equatorial plane E of the celestial canopy.

The specific reference mark of the aircraft also has as its origin the centre of gravity G thereof. It has a first axis $X_A$ directed along a longitudinal axis of the aircraft, a second axis $Z_A$ located in a plane of symmetry of the aircraft and a third axis $Y_A$ perpendicular to the first and second axes $X_1$, $Z_A$ of the specific reference mark.

According to the inventive process, this is followed by the definition of the aircraft attitude, in particular using on-board inertial processing means, by calculating the roll ($\phi$), pitch ($\theta$) and yaw ($\psi$) angles of the aircraft A with respect to a reference mark (G,X,Y,Z).

Figure 2:
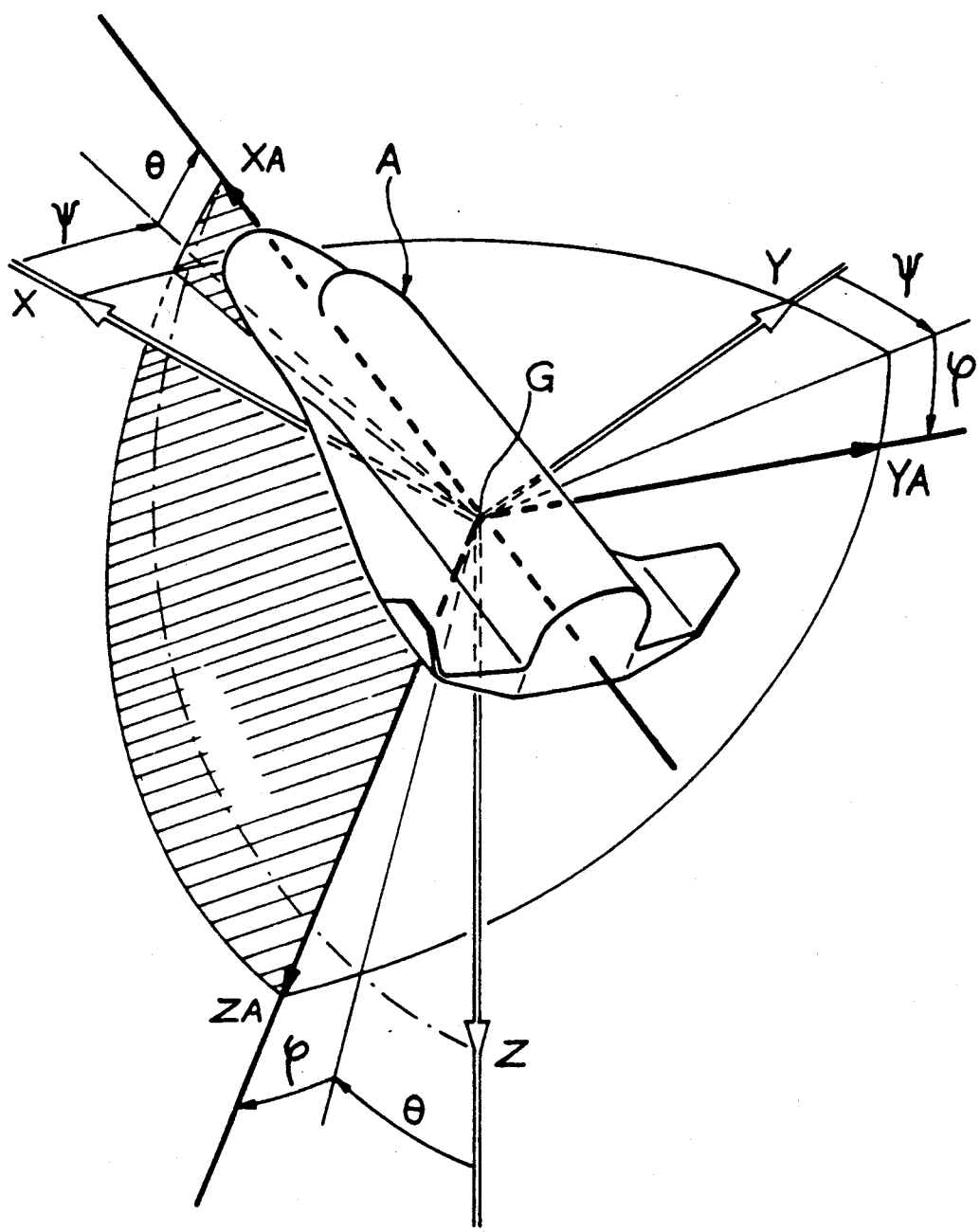
FIG. 2 the definition of the cardan or gimbal angles.

The calculation of these angles is well known in the art. However, to facilitate understanding, FIG. 2 makes it possible to define these angles.

The yaw angle $\psi$ is the angle of rotation about the axis Z of the reference mark, which brings the axis X of said mark into a coinciding location with the projection of the axis $X_A$ of the specific mark on the plane XY.

The pitch angle $\theta$ is the rotation angle about the axis Y, which makes the projection of the axis $X_A$ of the specific mark on the plane XY of the first mark coincide with the axis $X_A$.

The roll angle $\phi$ is the rotation angle about the axis $X_A$ of the specific mark, which makes the projection of the axis $Y_A$ of said specific mark on the plane XY of the first mark coincide with the axis Y of the reference mark.

As shown in FIG. 3, the process then consists of using the values of these cardan angles for displaying on a screen 1 of display means 2, the image 3 obtained in a plane perpendicular to the first axis $X_A$ of the specific mark of a net 4 formed from portions of the meridians M and parallels P of the celestial cavity C, projected onto said plane perpendicular to the interior of a circle B. The latter can be called the "flying circle" and is centered on the first axis $X_A$ of the specific mark.

It is e.g. determined by the intersection of the image plane with a cone having for its axis the axis $X_A$ of the specific mark, with an apex angle ($\alpha$) e.g. close to 30°. The apex S of said cone corresponds to the position of the eye of the observer (the aircraft pilot).

Figure 4:
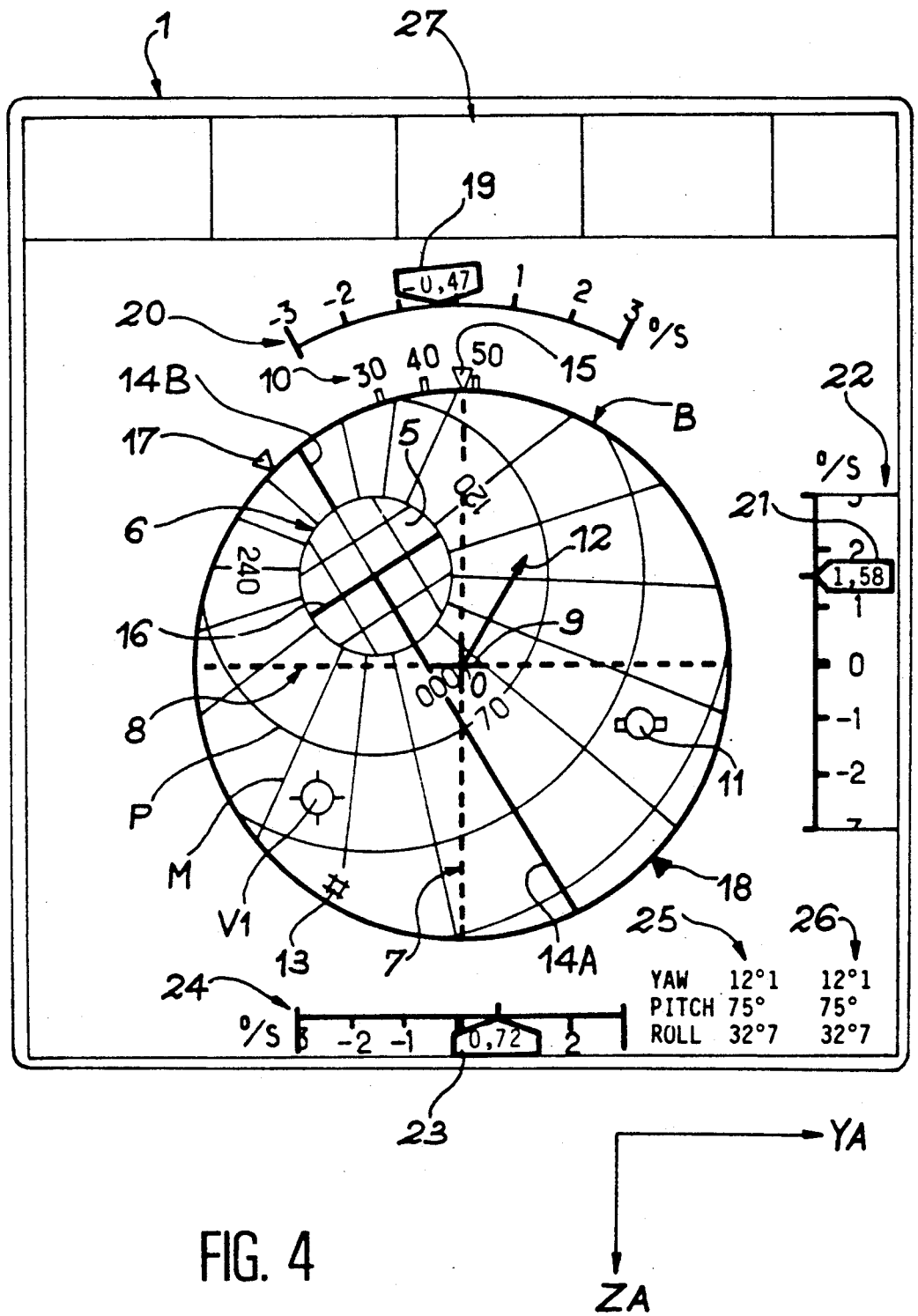
FIG. 4 diagrammatically the different information displayed according to the inventive process on the screen of the display means carried by the aircraft.

FIG. 4 provides a better understanding of the different information displayed on the screen 1 of the display means carried by the aircraft.

It is firstly possible to see on the said screen, the flying circle B and the net of portions of meridians M and parallels P, projected in the manner indicated hereinbefore onto a plane perpendicular to the axis $X_A$ of the specific reference mark within the circle B. It is obvious that the screen is not necessarily perpendicular to the axis $X_A$ of the specific reference mark, but can occupy any random position within the aircraft. It is in fact the image plane which is perpendicular to the axis $X_A$. The display means make it possible to display the image plane on the screen 1.

In FIG. 4 it is assumed that the next displayed is a portion of the celestial canopy corresponding to the displacement of the aircraft in the vicinity of one of its poles. Under these conditions and in known cartographic manner, the net of meridians and parallels is replaced by another reference net 5 forming a grid of crossed segments within a zone defined by a circle 6 and centered on the pole of the celestial canopy. The process also consists of displaying a cruciform reticule with two perpendicular segments 7,8 intersecting the flying circle B and crossing in the centre 0 of said circle, corresponding respectively to the axes $Z_A$ and $Y_A$ of the specific mark. The point 0 corresponds to the centre of gravity of the spacecraft. The central cross 9 of the reticule, permitting a better referencing of the centre 0, represents the actual spacecraft and defines its yaw $\psi$ and pitch $\theta$ angles, which are respectively designated in longitude and latitude, relative to a meridian portion and a parallel portion, close to said cross in the net appearing on the screen.

According to the process of the invention, the value of the roll angle $\phi$ is displayed in a scale 10 of numerical values close to the intersection of the flying circle B with the corresponding reticule segment 7. In the considered example, the roll angle $\phi$ is close to 48°.

The displayed information described hereinbefore are those which are essential for piloting. Other information will also be displayed and will be described hereinafter.

The essential conditions and in particular the net are displayed on the basis of a direct processing of the cardan angle values. However, in a preferred embodiment of the inventive process, the latter consists of expressing the cardan angles in the form of quaternions in order to determine the outline of the net on the screen. The theory of quaternions is in particular described in the book entitled "Les quaternions" by Paul Fayet de Casteljau - Editions Hermes.

Thus, although it is possible to plot the outline on the screen in a direct manner on the basis of the cardan angles, i.e. $\phi$ (roll), $\theta$ (pitch) and $\psi$ (yaw) supplied by on-board inertial means (the axis $X_A$ of the aircraft pointing towards the celestial canopy), said outline loses all accuracy when $\theta$ is close to 90°, i.e. is close to the poles. Close to poles the values of the yaw and roll angles lose all significance. Therefore for values of $\theta$ exceeding 80°, it is preferable to replace the net of meridians and parallels by a "grid" representation and, not matter what the value of $\theta$, to use quaternions for plotting the net. As a result of these quaternions, the representation of the aircraft attitude varies continuously, no matter what the value of $\theta$. The quaternion q is defined in the following way:

$$q = q1 + q2\vec{i} + q3\vec{j} + q4\vec{k}$$

$$\text{or } q = \begin{bmatrix} q1 \\ q2 \\ q3 \\ q4 \end{bmatrix}$$

q1,q2,q3,q4 varying continuously, even in the vicinity of the poles.

The relations between the cardan angles and the quaternion are:

$$q1 = \cos(\psi/2)\cos(\theta/2)\cos(\phi/2) + \sin(\psi/2)\sin(\theta/2)\sin(\phi/2)$$

$$q2 = \cos(\psi/2)\cos(\theta/2)\sin(\phi/2) - \sin(\psi/2)\sin(\theta/2)\cos(\phi/2)$$

$$q3 = \cos(\psi/2)\sin(\theta/2)\cos(\phi/2) + \sin(\psi/2)\cos(\theta/2)\sin(\phi/2)$$

$$q4 = \sin(\psi/2)\cos(\theta/2)\cos(\phi/2) - \cos(\psi/2)\sin(\theta/2)\sin(\phi/2)$$

The angles $\psi$, $\theta$, $\phi$ appearing in these relations are the cardan angles making it possible to pass from the reference mark (G,X,Y,Z) to the specific mark (G,XA,YA,ZA).

The known reference mark change relations are written:

$$\begin{bmatrix} X_A \\ Y_A \\ Z_A \end{bmatrix} = [A] \begin{bmatrix} X \\ Y \\ Z \end{bmatrix}$$

with $$A = \begin{pmatrix} \cos\theta\cos\psi & \cos\theta\sin\psi & -\sin\theta \\ -\cos\phi\sin\psi + \sin\theta\sin\phi\cos\psi & \cos\phi\cos\psi + \sin\theta\sin\phi\sin\psi & \cos\theta\sin\phi \\ \sin\phi\sin\psi + \sin\theta\cos\phi\cos\psi & -\sin\phi\cos\psi + \sin\theta\cos\phi\sin\psi & \cos\theta\cos\phi \end{pmatrix}$$

It is possible to define an intermediate specific reference (G, X'A, Y'A, Z'A) linked with the aircraft and which is more appropriate for piloting, by rotating the specific reference (G, XA, YA, ZA) by 180° about the axis $X_A$. It is on the basis of the specific intermediate reference (G, X'A, Y'A, Z'A) that it is possible to define a display or image reference marks and it is possible to write:

$$\begin{bmatrix} X'_A \\ Y'_A \\ Z'_A \end{bmatrix} = \begin{bmatrix} 1 & 0 & 0 \\ 0 & -1 & 0 \\ 0 & 0 & -1 \end{bmatrix} \cdot [A] \cdot \begin{bmatrix} X \\ Y \\ Z \end{bmatrix}$$

By combining the latter relation with the expression of the transformation matrix A expressed in the form of a quaternion, we obtain:

$$\begin{bmatrix} X \\ Y \\ Z \end{bmatrix} = [B] \cdot \begin{bmatrix} X'_A \\ Y'_A \\ Z'_A \end{bmatrix}$$

with $[B] = \begin{bmatrix} b11 & b12 & b13 \\ b21 & b22 & b23 \\ b31 & b32 & b33 \end{bmatrix}$ In said matrix:

$$\left.\begin{array}{l} b11 = 2(q1^2 + q2^2) - 1 \\ b21 = 2(q2 \cdot q3 + q1 \cdot q4) \\ b31 = 2(q2 \cdot q4 - q1 \cdot q3) \\ b12 = 2(q1 \cdot q4 - q2 \cdot q3) \\ b22 = 1 - 2(q1^2 + q3^2) \\ b32 = -2(q1 \cdot q2 + q3 \cdot q4) \\ b13 = -2(q2 \cdot q4 + q1 \cdot q3) \\ b23 = 2(q1 \cdot q2 - q3 \cdot q4) \\ b33 = 1 - 2(q1^2 + q4^2) \end{array}\right\} \quad (E1)$$

The final mark to be defined is the display reference mark, whose origin is the centre point of the display screen.

Relative to the specific intermediate mark (G, X'A, Y'A, Z'A), the display reference mark (0, x, y, z) can be defined in the following way. Its origin 0 is located in the aircraft cockpit. It is assumed that the point 0 is located at the distance 1 from the centre of the celestial canopy and that its coordinates with respect to the specific intermediate mark are (1,0,0). Its axis x coincides with the axis $X_A$ of the specific reference mark of the aircraft. Its axis y coincides with the axis $Z_A$.

Its axis Z coincides with the axis $X_A$.

Equation systems making it possible to pass from coordinates of one point in the reference mark (G,X,Y,Z) to the coordinates of said point in the display reference mark (o,x,y,z) are then as follows:

$$\begin{bmatrix} X \\ Y \\ Z \end{bmatrix} = \begin{bmatrix} b11 & b12 & b13 \\ b21 & b22 & b23 \\ b31 & b32 & b33 \end{bmatrix} \cdot \begin{bmatrix} 1 \\ -x \\ y \end{bmatrix} \quad (E2)$$

$$\begin{bmatrix} 1 \\ -x \\ y \end{bmatrix} = \begin{bmatrix} b11 & b12 & b13 \\ b21 & b22 & b23 \\ b31 & b32 & b33 \end{bmatrix} \cdot \begin{bmatrix} X \\ Y \\ Z \end{bmatrix} \quad (E3)$$

Thus, it is the equation system (E3), which is used for the display of the net on the display screen, oriented in accordance with piloting conventions.

The outline of the "grid" net in the vicinity of the polar caps (beyond $|\theta|=80°$) is obtained in the same way as the net plotted outside said polar caps, but by choosing a reference mark change in which the new axis X passes through the pole.

The process also makes it possible to display in the net displayed on the screen by a symbol V1, the location referenced by a meridian and a parallel pointed towards the celestial canopy, by a vector $\bar{V}$ representing the aircraft speed. In the next said symbol V is referenced in longitude and latitude. It makes it possible to indicate to the pilot the direction of travel of the aircraft, which generally differs from that of the longitudinal axis $X_A$ thereof. This direction is calculated on the basis of the values of inertial sideslip, list and incidence angles. According to the invention, a display also takes place on the screen of the position of another object in space. This position is indicated by a symbol 11 in the net, referenced by a latitude and a longitude respectively relative to a parallel portion and a meridian portion closest to the symbol 11 in the net. This other object can e.g. be an orbiting station with which the spacecraft is to dock. The position of said space station is also obtained on the basis of a quaternion calculation.

Another important information is that relating to the aircraft attitude prediction. It is e.g. the attitude for the aircraft in the ten following seconds. This information is supplied by a vector 12, called the "attitude prediction vector". This prediction is calculated by an on-board computer, particularly on the basis of cardan angle variation velocity values. This vector indicates the future orientation of the longitudinal axis XA of the aircraft.

In order to better guide the pilot in the aircraft evolution control, it is also possible according to the inventive process to select a reference attitude. By acting on the flight controls, the pilot must act in order to orient the aircraft in accordance with said reference attitude. The selected reference attitude is displayed by an attitude symbol 13 referenced in the net by a longitude and a latitude, respectively relative to a meridian portion and a parallel portion of the net.

In order to facilitate longitude referencing, the process consists of displaying in a particular manner an original meridian portion. This display is represented by the segments 14A,14B in the drawing. The latter also shows a meridian portion 16, perpendicular to the original meridian and which is displayed within the circle 6 defining the display zone of the polar cap.

Two roll angle reference symbols 17,18 are also displayed on the flying circle B. These symbols are diametrically opposite on said circle. They facilitate the immediate approximate perception of the roll angle. The precise knowledge of the roll angle is completed by the previously described numerical values 10 and indicating with greater accuracy the value of said angle. It is also possible to display an intermediate symbol 15 with a selected roll angle. It is in fact useful for the pilot to select a reference roll angle value, in order to act on the flight controls of the aircraft, in such a way that the latter maintains an attitude respecting said roll angle.

The process also consists of respectively displaying the roll, pitch and yaw variation velocity values (p,q,r), in cursors able to move relative to fixed scales.

Thus, the roll variation velocity p is displayed by a numerical value in the cursor 19, which moves relative to the fixed scale 20. In the represented example, said value is equal to $-0.47°/S$. The cursor position indicates the rightward or leftward tendency of the roll and in the present example it is to the left.

The pitch variation velocity q is displayed by a numerical value in the cursor 21, which moves relative to the fixed scale 22. In the represented example, said value is $+1.58°/S$. The cursor position indicates the upward or downward pitch tendency and it is upwards in the represented example.

Finally, the yaw variation velocity is displayed by a numerical value in the cursor 23, which moves relative to the fixed scale 24. In the represented example, said value is $+0.72°/S$. The cursor position indicates the tendency of the yaw, which is to the right in the present case.

The numerical values of the yaw, pitch and roll angles are respectively displayed in a zone 25 facing the indications YAW, PITCH AND ROLL. In the considered example, these numerical values are respectively 12.1°, 75° and 32.7°.

It is also possible to display in a zone 26 nominal respective numerical values for the yaw, pitch and roll angles. Finally, in a zone 27, it is possible to display e.g. pilot assistance information.

Specific colour codes are allocated to the different displayed information. These colour codes are e.g. as follows:

the screen background is black;

the flying circle B, the net of meridians and parallels, the grid and the circle 6, the lines 14A, 14B, 16, the scales 20, 22, 24, the informations YAW, PITCH AND ROLL, the symbols 17,18 and the roll values 10 are in white;

the mobile cursors 19,21,23 and the cruciform reticule 7,8,9 are yellow;

the numerical values contained in the cursors are in green;

the attitude prediction vector 12, the velocity symbol V1, the numerical values of the zone 25 and the information of the zone 27 are also in green;

the nominal station attitude and aircraft attitude symbols 13 and 11, the nominal roll symbol 15 and the numerical values of the zone 26 are in blue.

FIG. 5 diagrammatically shows an on-board system permitting the performance of the inventive process. Said system comprises an inertial station 28 supplying signals representing the cardan angles. This inertial station is connected to a computing and processing means 29 in particular calculating the quaternions and supplying on outputs information relative to the details to be displayed. This information is received by a graphic generator 30, which controls the display means 2, in order to display the aforementioned information, whilst in particular respecting the chosen colour codes.

In the process described hereinbefore, the attitude can be displayed in a random marking system deduced from the reference mark.

I claim:

1. Process for the display of the attitude of an aircraft or spacecraft for aiding piloting or flying in space, which comprises the steps of:

defining a spherical celestial canopy (C) centered on the center of gravity (G) of the aircraft (A), having a polar axis oriented towards the celestial north (N) and an equatorial plane (E) perpendicular to said polar axis and passing through a vernal reference marking point ($\gamma$ 50);

defining reference marking parallels (M,P) and meridians on said celestial canopy;

defining a reference mark (G,X,Y,Z) with orthogonal axes centered on the center of gravity (G) of the aircraft, a first axis (X) of said mark passing through the vernal point ($\gamma$ 50), a second axis (Z) coinciding with the polar axis and a third axis (Y) being perpendicular to the first and second axes;

defining a specific reference mark (G, $X_A$, $Y_A$, $Z_A$) of the aircraft with three orthogonal axes, having for its origin the center of gravity (G) of the aircraft, a first axis ($X_A$) directed along a longitudinal axis of the aircraft, a second axis ($Z_A$) located in a plane of symmetry passing through the longitudinal axis of the aircraft and a third axis ($Y_A$) perpendicular to the first and second axes of the specific reference mark;

defining the attitude of the aircraft by calculating the cardan angles, (roll ($\phi$), pitch ($\theta$) and yaw ($\psi$) ) of the aircraft with respect to the reference mark (G,X,Y,Z);

using the values of the cardan angles ($\phi$, $\theta$, $\psi$) for displaying, on a screen (1) of display means (2), the image obtained in a plane perpendicular to the first specific axis ($X_A$) of a net formed from portions of meridians and parallels (M,P) of the celestial canopy projected onto said plane within a piloting or flying circle (B), displayed on a screen (1) and centered on the first axis ($X_A$) of the specific reference mark;

displaying a cruciform reticule (7,8,9) with two perpendicular segments (7,8) intersecting the flying circle, intersecting in the center (O) of the circle (B) and corresponding respectively to the second and third axes ($Z_A$, $Y_A$) of the specific reference mark, the position of the center (O) of the circle respectively representing the yaw and pitch angles referenced in longitude and latitude, respectively with respect to a meridian portion (M) and a parallel portion (P) of the net;

and displaying the value of the roll angle ($\phi$) in a scale (10) of numerical values, close to the intersection of the flying circle (B) with the segment (7) of the reticule corresponding to the second axis ($A_A$) of the specific reference mark.

2. Process according to claim 1, characterized in that, in a predetermined circular zone (5) around each pole of the celestial canopy, said process further comprising the step of replacing the display of a net of portions of meridians and parallels of the celestial canopy by a net forming a reference grid within a circle (6) defining said zone.

3. Process according to claim 2, wherein the cardan angles ($\phi$, $\theta$, $\psi$) are expressed in the form of quaternions.

4. Process according to claim 3, further comprising the step of:

displaying by a symbol (V1) in the net, the location of a point on the celestial canopy, this point being the intersection of a vector representing the speed of the aircraft (A) and of the celestial canopy, said symbol being positioned in the net and indicating the sideslip and incidence angles of the aircraft, referenced in longitude and latitude.

5. Process according to claim 3, further comprising the step of displaying the position of another object in space by a symbol (11), said object referenced in the net by a longitude and a latitude corresponding to said position.

6. Process according to claim 3, further comprising the step of also displaying a short term prediction vector (12) of the aircraft attitude.

7. Process according to claim 3, further comprising the step of displaying the selected attitude of the aircraft by an attitude symbol positioned in the net in longitude and latitude.

8. Process according to claim 3, further comprising the step of displaying an original meridian portion (14A, 14B) from among the meridian portions displayed in the net.

9. Process according to claim 8, further comprises the steps of displaying two reference symbols (17, 18) of the roll angle ($\phi$), which are diametrically opposite on the flying circle (B), and displaying on said flying circle an intermediate symbol wherein is indicated a selected roll angle.

10. Process according to claim 3, further comprising the step of displaying respectively numerical roll, pitch and yaw velocity values (p,q,r) in cursors (19,21,23), which move relative to fixed numerical value scales (20,22,24).

11. Process according to claim 3, further comprising the step of displaying the respective numerical values (25) of the roll, pitch and yaw angles ($\phi$, $\theta$, $\psi$).

12. Process according to claim 11, further comprising the step of displaying the respective reference numerical values (26) respectively for the roll, pitch and yaw angles.

* * * * *